United States Patent [19]
Cobb

[11] 3,791,592
[45] Feb. 12, 1974

[54] GRAIN SPREADER
[76] Inventor: Wayne E. Cobb, 385 Harrison St., Valparaiso, Ind. 46383
[22] Filed: Aug. 23, 1972
[21] Appl. No.: 283,054

[52] U.S. Cl............ 239/666, 239/687, 214/17 CB
[51] Int. Cl........................................... A01c 17/00
[58] Field of Search......... 239/666, 687; 214/17 CB

[56] References Cited
UNITED STATES PATENTS
3,488,007  1/1970  Neuenschwander............... 239/687
3,282,591  11/1966  Donelson.................... 214/17 CB X

*Primary Examiner*—M. Henson Wood, Jr.
*Assistant Examiner*—Gene A. Church

[57] ABSTRACT

The invention deals with spreading grain in a bin and comprises a spreader having an impeller which is adjustably secured to a lower offset portion of a driven shaft for directing grain generally radially outwardly for uniform distribution in the bin.

17 Claims, 9 Drawing Figures

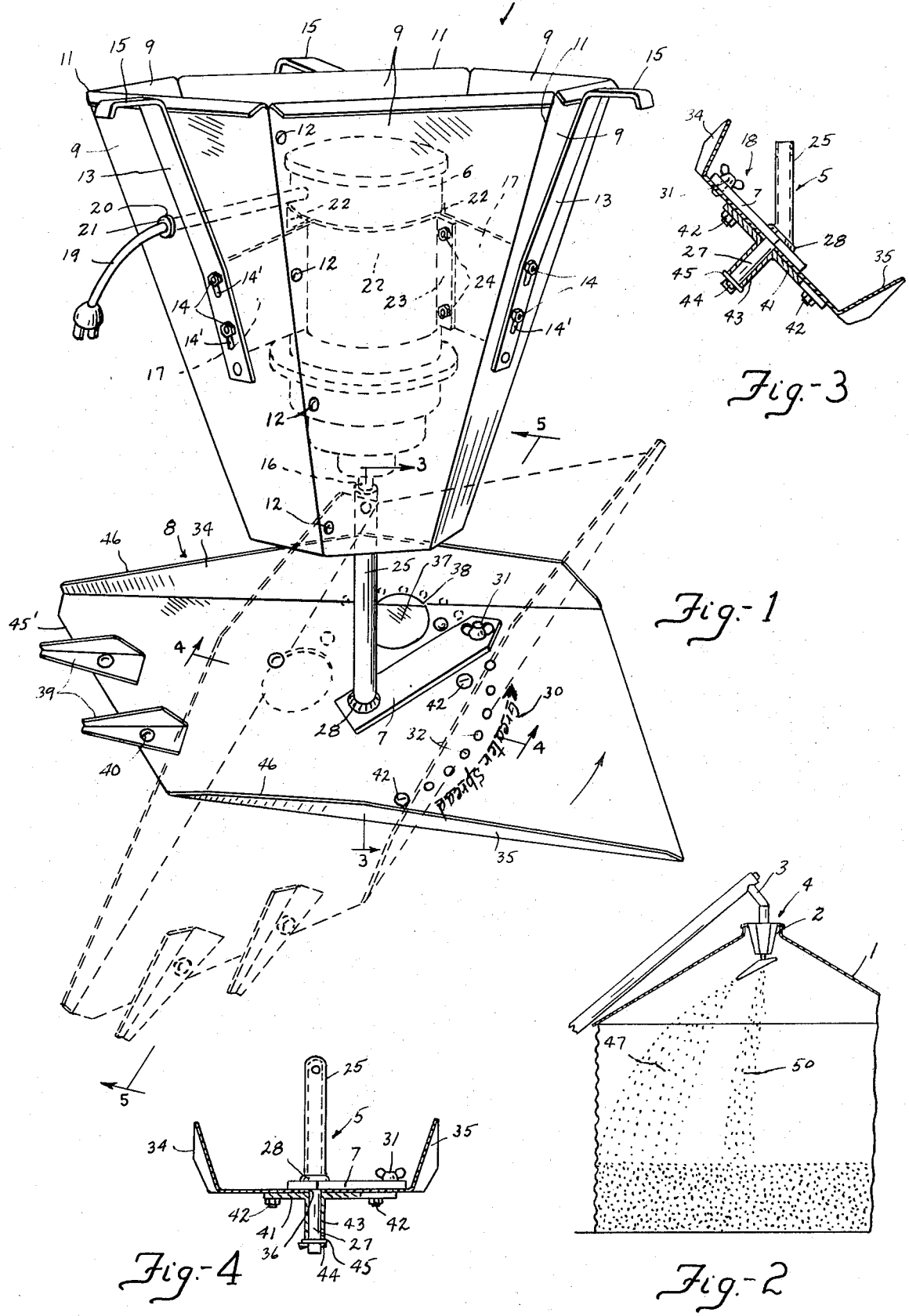

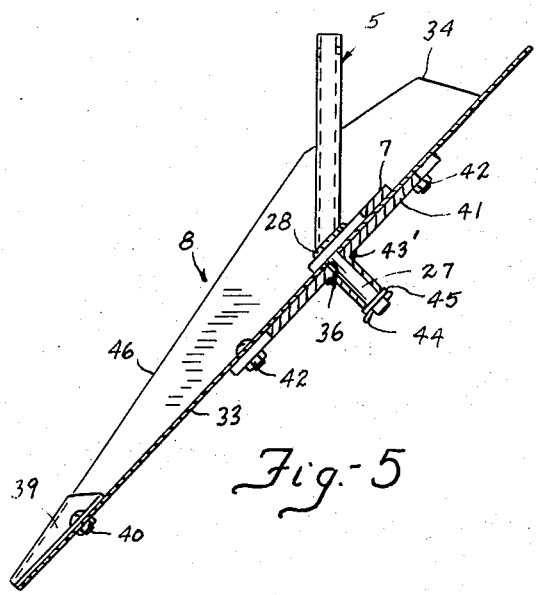
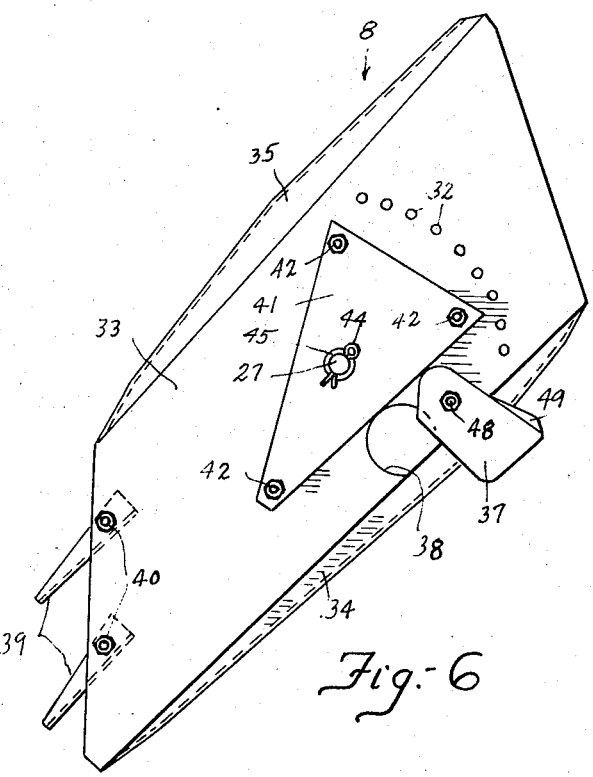
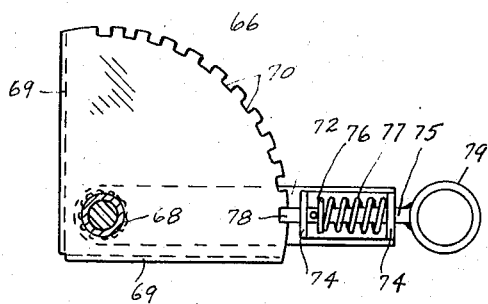
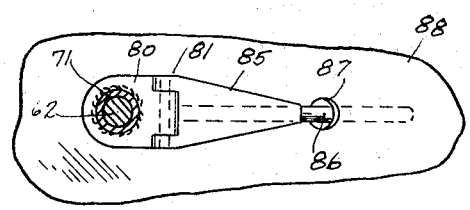
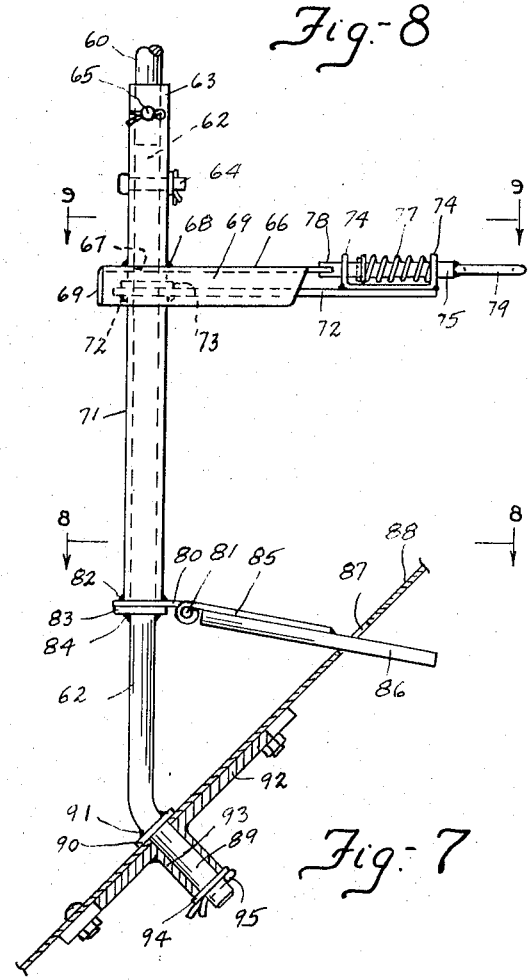

GRAIN SPREADER

The invention relates generally to means for spreading a flowable granular or comminuted material and more particularly is directed to what is known in the trade as a grain spreader which is mounted in the upper end of a bin for dispensing generally radially a grain, such as corn, wheat, rice, beans, etc., into the bin.

In order to obtain a better understanding of the objectives of the subject invention, attention is directed to the fact that some of the grain spreaders which are presently available are comprised of a multitude of components which are not only expensive but require an appreciable amount of time and effort to manufacture and assemble and some also require an appreciable amount of time and effort and an assortment of different fittings and tools to facilitate adjustment of the spreader after it has once been installed.

With the foregoing in mind, one of the important objects of the invention is to provide a spreader which is comprised of a minimum number of relatively inexpensive components which can be readily assembled or disassembled and also can be readily installed.

A significant object of this invention is to provide a spreader which preferably includes a hopper or funnel shaped grain receiving means provided with a lower aperture, a rotatable shaft having an upper straight extremity which is adapted to extend vertically upward through the aperture for connection with operating or driving means, such as an electric motor, and a lower straight extremity which is offset at an angle with reference to the upper extremity, and impeller means which is carried by the lower extremity for rotation therewith for uniformly and gently distributing or spreading the grain in a bin or elsewhere to a substantially uniform depth to promote drying thereof.

A particularly significant object of the invention is to provide an impeller for spreading granular material, means for rotating the impeller in a substantially conical path, and means whereby the impeller may be adjusted to different fixed angular positions in said path whereby the throwing range of the impeller may be modified.

Another object of the invention is to provide an impeller with a throwing wall, means for rotating the impeller in a substantially conical path, and means whereby the inclination of the wall and its distance from the axes of rotation may be adjusted whereby the throwing range of said wall may be varied.

Another and important object of the invention is to provide a spreader which after being initially installed may be readily adjusted to meet different conditions of its use. More particularly in this respect, provision is made whereby the impeller may be readily adjusted, without the aid of tools, in any one of a number of diametrical ranges.

A specific object of the invention is to provide a spreader in which the funnel shaped grain receiving means above referred to, is preferably hexagonal in cross-section in order to facilitate substantially uniform flow of the grain therethrough.

Another specific object of the invention is to provide a relatively large generally rectangular impeller having a planar bottom wall and planar side walls, and the bottom wall is provided with adjustable abutments in the form of fingers and with manually controllable valve means which serve in their respective capacities for controlling the flow of grain from and through the impeller.

Also, an object of the invention is to provide means for adjustment of the impeller for rotation with the shaft. Otherwise expressed, means are provided which serve the dual function of keying the impeller for rotation with the shaft as well as affording adjustment of the impeller relative to the shaft to meet different operational requirements.

A further object of the invention is to provide a modified form of spreader which includes a shaft having extremities which are offset with respect to one another, an impeller which is connected to the shaft and a different form of control or means is utilized whereby the impeller may be adjusted relative to the shaft from a remote location.

A specific object of the invention is to provide a spreader with unique means whereby to facilitate installation of the spreader in a correct vertical operative position.

Additional objects and advantages of the invention will become apparent after the description hereinafter set forth is considered in conjunction with the drawings annexed hereto.

In the drawings:

FIG. 1 is a side elevational view of a preferred form of a spreader, embodying the invention, in which the impeller thereof is shown in two of the several positions in which it may be adjusted;

FIG. 2 is a partial side elevational view of a bin showing the spreader mounted thereon;

FIG. 3 is a transverse section taken substantially on line 4—4 of FIG. 1 depicting one position at which the impeller may be adjusted;

FIG. 4 is a transverse section taken substantially on line 4—4 of FIG. 1 showing another adjustment of the impeller;

FIG. 5 is a transverse section taken substantially on line 5—5 of FIG. 1 showing details of the impeller;

FIG. 6 is a bottom view of the impeller;

FIG. 7 is an elevational view showing a modified structure whereby the impeller may be adjusted from a remote location;

FIG. 8 is a horizontal section taken substantially on line 8—8 of FIG. 7; and

FIG. 9 is a horizontal section taken substantially on line 9—9 of FIG. 7.

Referring first to FIG. 2, there is exemplified a conventional receiving means in the form of a bin 1 provided with an upper central opening 2 through which grain is to be introduced, for example, by a conduit 3. The spreader, embodying the subject invention, is adapted for disposition in the opening 2 for receiving and distributing the incoming grain in a direction generally radially outward to facilitate filling of the bin to a substantially uniform depth as shown and promote uniform drying of the grain.

More particularly, the spreader, among other things, as shown in FIG. 1, includes a receiving means generally designated 4, a shaft generally designated 5, driving or operating means 6 for the shaft, means preferably in the form of an arm 7 extending laterally from the shaft, and an impeller generally designated 8 carried by the shaft.

The receiving means 4 is preferably in the form of a hopper or funnel of hexagonal cross-section defined by six planar substantially corresponding tapered portions or panels 9, the lower ends of which form an outlet or aperture 10 through which the grain flows into the bin. The hopper is preferably comprised of three sections 11 and each section has a pair of angularly disposed panels. The edges of the sections are preferably secured together by bolts or screws 12. Obviously, the hopper may be of a one-piece construction. The polygonal cross-sectional shape of the hopper serves to prevent the grain from whirling or vortexing in the hopper outlet, thereby providing a higher flow rate and laminar flow. More specifically in this respect, the side wall structure of the hopper comprises a plurality of impact surfaces disposed about its longitudinal axis which serves the aforesaid purpose. The hopper may be mounted in any manner desired but is preferably installed by utilizing a plurality of three circumferentially spaced elongated angularly disposed corresponding brackets 13 which have lower ends which are preferably respectively anchored to the sections 11 of the hopper by fasteners in the form of bolts 14 and upper offset ends 15 which may be hooked upon the material defining the opening 2 in the bin for supporting the spreader in a vertical operative position as shown in FIG. 1. If so desired, the brackets may be of a resiliently flexible character so that they will assist in resiliently maintaining or supporting the spreader in a correct position.

The spreader includes the operating or driving means 6 which is preferably in the form of a rugged heavy duty electric gear motor unit having a drive shaft 16. The motor is adpated for conventional connection with a source of electricity and may be mounted in the hopper in any manner desired, but as depicted it is preferably detachably secured by three substantially corresponding circumferentially spaced radially disposed fittings 17 for locating the motor in a central vertical position and the cross dimensions of the motor and hopper are preferably such that these components are arranged in a concentric spaced relationship in order to provide a substantially annular space of a size whereby to allow for the free flow of grain through the outlet 10. This annular space and the size of the outlet 10 may be such that the hand of an operator may be inserted therethrough in order that an adjustable device generally designated 18, hereinafter described, may be readily manipulated. Attention is directed to the fact that preferably two of the brackets are preferably provided with aligned slots 14' so that the bolts may be extended through the desired slots in a manner whereby the spreader may be readily correctly installed in a vertical operative position in the bin. Attention is also directed to the fact that the motor and support fittings therefor are located a predetermined distance above the outlet 10, so that the extrance area to the outlet is substantially free of all obstructions, thereby facilitating free flow of the material through the outlet. The motor unit 6 is provided with an extension cord 19 which is adapted for disposition generally in alignment with the plane of a fitting 17 and extends outwardly through an aperture 20 provided therefor in one of the hopper sections 11 for connection with a source. It will be noted that that portion of the cord within the hopper is preferably protected from the grain by a sleeve 21.

Attention is directed to that fact that the outer ends of the fittings 17 are provided with offset flanges (not shown) and that the bolts 14 extend not only through the brackets 13 but also through holes provided therefor in the sections 11 and the aforesaid flanges. Otherwise expressed, the bolts 14 serve the dual purpose of securing the fittings and brackets to the hopper.

Attention is also directed to that fact that the fittings 17 are provided with arcuate portions 22 having flanges 23 which respectively engage the radial portions of the fittings so that when bolts 24 are extended through the flanges and portions the arcuate portions 22 will clamp about the motor unit for firmly securing the same in an operative position.

The shaft 5, above referred to, preferably has an upper straight tubular extremity 25 which is detachably telescopically connected or carried by the motor drive shaft 16 in any manner desired, such as by a pin 26 which extends through transverse mating aligned holes provided in the shaft 16 and the upper extremity 25. The shaft 5 also has a lower solid extremity 27 which is offset at an angle with respect to the upper extremity. The lower extremity 27 is also preferably of a length and cross-section somewhat less than that of the upper extremity and provided with a transverse aperture at its free end. The inner ends of the extremities 25 and 27 are preferably permanently joined by welding 28, which also serves to permanently secure the inner end of the arm 7 between the extremities so that the arm is fixed at an acute angle with reference to the upper extremity 25 and at right angles or perpendicular to the lower extremity.

The inner end of the arm 7 may be provided with an aperture for receiving the inner end of the offset extremity whereby to facilitate welding of the components. The outer end of the arm is preferably pointed as indicated at 29 for use with indicia such as that indicated at 30 to assist in adjustment of the spreader so that a fastening means or control in the form of a thumb or set screw 31 carried by the arm may be utilized for selective engagement with any one of a number of spaced cooperable means in the form of apertures 32 provided in an arcuate design in the impeller, all of which will be described more in detail subsequently.

The impeller 8 of the spreader may be designed and constructed in various ways but as disclosed in FIGS. 1, 3, 4, 5, and 6 it is preferably constructed of a suitable sheet metal material and is generally made rectangular in shape, having a bottom or base wall 33 and a pair of upturned side walls 34 and 35. The bottom wall is provided with: the apertures 32, above referred to; a generally central aperture 36 through which the lower offset 27 extends; a valve 37 and opening 38 therfor, and a pair of elongated abutments or fingers 39 which are respectively adjustably connected to a discharge end of the impeller by a pair of bolts or screws 40. The bottom wall is preferably reinforned by a triangular rigid plate 41 which is secured by bolts 42 to the underside of the bottom wall 33 as clearly shown in FIGS. 5 and 6. A tubular bearing or hub 43 is welded at 43' to locate the hub perpendicular to the plate and in alignment with the center aperture in the bottom wall whereby to receive the lower offset 27 of the shaft. A fastening means preferably in the form of a cotter pin 44 is extended through the aperture in the free end of the offset 27 for detachably connecting the impeller to the shaft and holding a washer 45 against the end of the offset.

Referring further to the structure of the impeller 8, it will be observed by referrring to FIGS. 1, 2, and 6 that the fore edge of the bottom wall of the dispensing extremity of the impeller is bevelled as indicated at 45 with reference to its side walls 34 and 35; that the fore portions of the latter are also bevelled as indicated at 46; and that the side wall 34 may be termed an impact surface, a throwing wall, or a grain directing wall or vane, due to the fact that an appreciable quantity of the grain in falling onto the spreader via the outlet 10 in the hopper is forcibly engaged by the wall 34 when the impeller is rotated in a counter-clockwise direction as indicated by the arrow in FIG. 1 by the power means or motor 6 and directed substantially radially outward into the bin 1 as indicated at 47 in FIG. 2. The bevel 45' serves to control the flow of the grain from the spreader in a desirable pattern for distribution.

The valve 37, above referred to, is connected to the impeller by pivot means 48 as best depicted in FIG. 6 and is provided with an offset flange 49 which may be manually engaged by an operator for opening and closing the round valve opening 38 provided in the bottom wall of the impeller, preferably at a location between the bottom reinforcing plate and the side wall 35 of the impeller. This manually operable valve affords means whereby some of the incoming grain will flow through the impeller for deposit generally at or toward the center of the bin as indicated at 50 in FIG. 2 in order to assist in obtaining a substantially uniform depth or level of grain the bin. Obviously the valve opening and valve may be constructed in shapes and locations other than that shown. More specifically, however, the valve, as shown, is located in the leading quarter portion of the trailing extremity of the impeller whereby to substantially prevent clogging of the valve opening. Otherwise expressed, at least a portion of the valve is located in an area of the impeller about the axis of its rotation which has a cross-dimension no larger than the cross-dimension of the outlet 10 of the hopper. Also, it should be obvious that the valve may be adjusted to a closed or to a fully open position or in any position therebetween whereby it will serve its intended purpose.

The abutments or fingers 39, as alluded to above, are adjustably carried by the discharge extremity of the impeller whereby to assist in controlling the direction and the amount of flow of grain from the spreader. If, for example, the fingers are adjustably secured generally transverse or at an angle with reference to the length of the spreader the flow of the grain from the spreader may be curtailed, as distinguished from their being located as shown where they increase the distance of the diametrical range of dispersal.

As set forth above, one of the important objects of the subject invention is to provide a spreader in which the impeller thereof may be readily adjusted in different positions so that grain may be dispensed or thrown substantially radially outward in different diametrical ranges to distribute grain in bins having different diameters.

More particularly, the adjustable structure is preferably such that when, for example, the screw 31 on the arm 7 is detachably secured in any one of the apertures 32 located adjacent the valve 37 as exemplified in FIG. 1, the impeller will be disposed more or less in a horizontal inclined position as also shown in FIG. 3 so that the diametrical range of the grain dispensed will be greater than that when, for example, the impeller is adjusted to the dotted line position in FIG. 1 and as evidenced in FIG. 4, in which position the pointed end of the arm 7 is held adjacent to the side wall 35 by securing the screw 31 in any one of the apertures 32 adjacent this wall. In other words, when the impeller is adjusted more toward an upright dotted line position the diametrical range of the grain dispensed will be less than that when the impeller is more or less in the full line position shown. The impeller may be adjusted to the position desired by merely turning the impeller relative to the offset 27 of the shaft and then securing it in place by utilizing the thumb or set screw 31. Manipulation of this screw or control may be accomplished by reaching downwardly through the hopper and opening 10.

In view of the foregoing, it will be manifest that the impeller has a bottom wall 33 defining a plane and a throwing wall 34 which is inclined relative to the bottom wall and that the adjustment above described enables an operator to locate the impeller in different fixed angular positions so that when it is rotated in a substantially conical path the impeller and particularly its throwing wall may be caused to disperse a granulated material in variable dismetrical ranges. More explicitly, the adjustment affords a unique setup whereby the inclination of the throwing wall and its distance from the axis of rotation may be modified whereby the radial throw of the material may be increased or decreased for the purpose set forth above.

The modified structure exemplified in FIGS. 7, 8, and 9 will now be described. As pointed out above this structure affords a set-up whereby the impeller may be adjusted from a remote location. This structure is adapted for detachable driving connection with a drive shaft 61 of a motor and comprises, among other things, a solid shaft having an upper straight extremity of appreciable length disposed in an upper tubular member or sleeve 63 and is keyed or connected thereto by a bolt 64. This tubular member is adapted to receive the shaft 61 and be keyed thereto by a pin 65.

A sector or quadrant 66 is provided with an aperture 67 through which the shaft 62 extends and is preferably permanently secured thereto by welding 68 as depicted in FIG. 7. The sector 66 extends radially from the member 63 and includes side walls 69 to form a housing or shell and is provided with an arcuate ring of cooperating means preferably in the form of notches 70.

The structure also includes a lower tubular member or sleeve 71 which surrounds the extremity 62 of the shaft and its upper end is preferably permanently secured to a radially extending arm 72 by welding 72'. The extremity 62 extends through the arm 72 and a washer 73 is preferably interposed between the ends of the tubular members 63 and 71 to facilitate relative movement therebetween. The outer end of the arm 72 is provided with a bracket having apertured upturned ends 74 through which a control element or pawl 75 extends for reciprocation. The element is provided with an abutment 76 located between the ends 74 and a helical spring 77 is interposed between the abutment 76 and the outermost end 74 for urging or biasing the element inwardly so that its inner bifurcated end 78 may be caused to enter any one of the notches 70 and receive some of the material defining a notch for locating the lower tubular member 71, arm 72 and the element 75 as a unit in any desired pivoted position relative to the upper tubular member 63 and shaft extremity 62 which also constitutes a unit. The outer end of the element 75 is provided with an eye 79 for manual engagement or for connection with a line whereby to facilitate its operation so that the arm 72 may be moved to the desired position. It will be observed that the washer 73, welding 72' and inner end of the arm 72 are substantially concealed by the side walls 69 of the sector 66.

A leaf 80 of a hinge 81 is preferably permanently secured by welding 82 to the lower end of the lower tubular member 71. The shaft extremity 62 extends through a clearance hole in the hinge leaf 81 and a washer 83 is preferably welded at 84 to the extremity 62. The other leaf 85 of the hinge carries an elongated rod 86 having an outer end which engages a cooperable means preferably in the form of an opening 87 provided therefor in a bottom wall of an impeller 88. With this setup the lower tubular member 71, arm 72, hinge 81 and the member or rod 86 constitute a unit which may be pivoted relative to the shaft extremity 62, upper tubular member 63 and sector 66 thereon and the motor shaft 60 to which the member 63 is connected.

The solid shaft also includes a lower offset or extremity 89 which has an abutment in the form of a washer 90 which is preferably permanently secured thereto by welding 91. The impeller 88 is reinforced by a bottom rigid plate 92 which carries a tubular bearing or hub 93 which is pivotally mounted on the offset 89 and held thereon by a washer 94 and a cotter pin 95 which extends transversely through a hole provided in the outer end of the offset as shown. The impeller is preferably provided with valve means corresponding to the valve means above referred to.

In view of the foregoing it will be evident that by manipulating the lever 72 the rod 86 will cause the impeller to pivot relative to the offset to obtain the desired adjustment of the impeller. The structure may be so designed and constructed that the control or element 75 is located within the confines of a hopper or in the vicinity of its outlet.

The spreader structure described above offers advantages with respect to its unique design and construction, minimum number of components which are economical to manufacture and assemble, efficiently in use, ease of installation, adjustment of the impeller, and durability.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A subassembly of a spreader for granular material comprising: a shaft adapted for rotation having an upper extremity and a lower extremity offset at an obtuse angle with reference to said upper extremity for conical motion, impeller means pivotally carried by said lower extremity for spreading the material generally radially when the impeller means is rotated, means carried by and extending outwardly from said shaft, and means for connecting said impeller means to said extending means in any one of a number of different pivotal positions relative to said lower extremity.

2. The subassembly defined in claim 1, in which said impeller means has a hub which receives said lower extremity of said shaft, said extending means is in the form of an arm which is fixedly secured to said shaft adjacent the junction between its extremities, and said connecting means comprises spaced cooperable means provided on said impeller and said arm carries a fastening means which is selectively engageable with any one of said cooperable means whereby said impeller means may be adjusted to different positions relative to said lower extremity.

3. A spreader for granular material comprising: means for receiving the material having a lower outlet through which the material is dispensed, a shaft disposed in said receiving means, said shaft having an upper extremity and having a lower extremity extending downwardly in offset obtuse angular relation to said upper extremity for conical motion, and an impeller carried by said lower extremity for rotation with said shaft for distributing material introduced to said receiving means in a generally radial direction after it flows downwardly through said outlet.

4. The spreader defined in claim 3, including means whereby said impeller may be manually adjusted to different angular fixed positions relative to said lower extremity for rotation therewith whereby the impeller may be caused to distribute the material in different diametrical ranges.

5. The spreader defined in claim 3, including brackets for supporting said receiving means, fittings for supporting said shaft in said receiving means, and means common to said brackets and fittings extend therethrough for securing them to said receiving means.

6. The spreader defined in claim 3, in which said receiving means is substantially hexagonal in cross-section.

7. An impeller for distributing a granular material in a substantially radial direction when connected to a rotatable shaft, said impeller being generally in the form of an elongated channel with a discharge end having a bottom wall and an upturned side wall, said bottom wall and said side wall being bevelled at said discharge end, and said bottom wall being provided with valve means which may be manually operated to permit some material to flow through said impeller when the latter is distributing the material.

8. Structure comprising: a shaft having an upper extremity and a lower obtusangular offset extremity for conical motion, an impeller for spreading a granular material, said impeller having a bottom wall and at least one side wall, a reinforcing plate fixedly secured to the underside of said bottom wall and provided with a hub which is pivotally connected to said offset extremity, an arm having an inner end fixedly secured to said shaft at the junction between its extremities and also having an outer end, and said bottom wall and said outer end being respectively provided with cooperable means whereby said impeller may be pivotally adjusted relative to said lower extremity for modifying the angular position of the impeller in order that the range of spread may be varied as desired.

9. The structure defined in claim 8, in which said cooperable means comprises apertures provided in said impeller and a fitting carried by said outer arm end for selective locking disposition in any one of said apertures.

10. Structure comprising: a shaft having an upper extremity and a lower obtuseangle offset extremity for conical motion, an impeller carried by said offset extremity for pivotal adjustment to a fixed position in a plane generally perpendicular to the longitudinal axis of said lower extremity, said impeller being provided with cooperable means spaced from said lower extremity, and manually operable means carried by said upper extremity and provided with means engaging said cooperable means whereby said impeller may be adjusted to a desired angular position relative to said offset extremity.

11. The structure defined in claim 10, including means fixedly secured to said upper extremity for cooperation with said manually operable means for locking the latter in different positions.

12. A spreader for granular material comprising: a hopper having a lower outlet, a motor disposed in said hopper and having a drive shaft, a driven shaft having an upper extremity connected for rotation with said drive shaft and a lower obtusangular extremity offset from said upper extremity for rotation therewith and extending radially therefrom for conical motion, an impeller connected to said lower extremity for pivotal movement generally in a plane perpendicular thereto, said impeller being provided with an aperture located in a position spaced from said lower extremity, tubular means surrounding a portion of said upper extremity, means fixedly carried by a lower portion of said tubular means and having a pivotal member extending through said aperture, and lower means fixedly carried by an upper portion of said tubular means and extending radially therefrom in relation to said upper radially extending means, and cooperable means respectively provided on said upper and lower radially extending means whereby said lower extending means, said tubular means and pivotal member may be adjusted as a unit relative to said upper extending means whereby said pivotal member will cause said impeller to pivot relative to said lower extremity to vary the angular position of the impeller whereby the distributing range of the material may be modified.

13. A hopper for receiving a flowable granular material, said hopper having three or more side walls forming a funnel having an outlet through which the material is dispersed, and said side walls being so designed and constructed that vortexing of the material in the funnel is minimized whereby to provide a high flow rate of the material through said outlet.

14. In combination: a hopper provided with an outlet, shaft means supported in said outlet for rotation about a substantially vertical axis, an impeller connected to said shaft means, said impeller having a bottom and a side wall for throwing outwardly a granular material adapted to flow downwardly through said outlet onto said bottom, said impeller being provided with manually operable valve means whereby some of the material flowing through said outlet may be caused to flow through said bottom, and said valve means being located in a diametrical area about said axis which is no greater than the cross-sectional dimension of said outlet.

15. An impeller for dispersing a flowable granular material, said impeller being substantially in the form of an elongated channel having a discharge extremity from which the material is dispersed when the impeller is rotated and also having an opposite extremity, and valve means located in a leading quarter area of said opposite extremity whereby when desired some of the material may be caused to flow transversely through said impeller.

16. Structure comprising a shaft adapted for rotation having an upper extremity and a lower obtusangular offset extremity for conical motion, and an impeller carried by and adjustable on said offset extremity to a fixed position thereon whereby said impeller will travel in a substantially conical path about the axes of said upper extremity when the shaft is rotated.

17. In combination: an impeller provided with a throwing wall, means for rotating the impeller in a substantially conical path, and means whereby the inclination of said wall and its distance from the axis of rotation may be adjusted whereby the throwing range of said wall may be varied.

* * * * *